US012724696B2

(12) United States Patent
Palanisamy et al.

(10) Patent No.: US 12,724,696 B2
(45) Date of Patent: Sep. 1, 2026

(54) SYSTEM AND METHOD FOR DYNAMICALLY GENERATING AUTOMATION TEST SCRIPTS FOR SOFTWARE APPLICATIONS COMPRISING MULTIPLE VERSIONS

(71) Applicant: BANK OF AMERICA CORPORATION, Charlotte, NC (US)

(72) Inventors: Lakshman Prabhu Palanisamy, Chennai (IN); Srinivas Akkaladevi, Hyderabad (IN); Sivasankar Karunagaran, Edison, NJ (US); Natarajan Venkatarathinam, Chennai (IN)

(73) Assignee: BANK OF AMERICA CORPORATION, Charlotte, NC (US)

( * ) Notice: Subject to any disclaimer, the term of this patent is extended or adjusted under 35 U.S.C. 154(b) by 263 days.

(21) Appl. No.: 18/427,423

(22) Filed: Jan. 30, 2024

(65) Prior Publication Data

US 2025/0245130 A1 Jul. 31, 2025

(51) Int. Cl.
*G06F 11/3668* (2025.01)

(52) U.S. Cl.
CPC ........ *G06F 11/368* (2013.01); *G06F 11/3684* (2013.01)

(58) Field of Classification Search
CPC .......................... G06F 11/368; G06F 11/3684
See application file for complete search history.

(56) References Cited

U.S. PATENT DOCUMENTS

| | | | |
|---|---|---|---|
| 6,662,312 | B1 | 12/2003 | Keller et al. |
| 7,426,565 | B1 | 9/2008 | Tormasov et al. |
| 7,664,993 | B2 | 2/2010 | Alladi et al. |
| 8,739,126 | B2 | 5/2014 | Glaser et al. |
| 8,745,641 | B1 | 6/2014 | Coker |
| 8,868,981 | B2 | 10/2014 | Glaser et al. |
| 9,170,847 | B2 | 10/2015 | Huggins et al. |
| 10,445,221 | B2 | 10/2019 | Bromann et al. |

(Continued)

FOREIGN PATENT DOCUMENTS

| | | | | |
|---|---|---|---|---|
| CN | 106130809 B * | 6/2019 | .......... | H04L 41/069 |
| DE | 102012223587 A1 | 7/2014 | | |

*Primary Examiner* — Daxin Wu
(74) *Attorney, Agent, or Firm* — Moore & Van Allen PLLC; Nicholas C. Russell

(57) ABSTRACT

Embodiments of the present invention provide a system for dynamically generating automation test scripts for software applications comprising multiple versions. The system is configured for identifying a new version of a software code associated with a software application in a code repository in a software development environment, scanning the new version of the software code, identifying new changes to the software code based on scanning the new version of the software code, analyzing the new changes to determine impact associated with the new changes, determining a first set of new changes from the new changes that have an impact on an automation base repository associated with testing the software code, identifying locators associated with the first set of new changes, dynamically creating a new version of a test repository corresponding to the new version in the code repository, and updating the new version of the test repository with the locators.

17 Claims, 8 Drawing Sheets

(56) References Cited

U.S. PATENT DOCUMENTS

| | | | | |
|---|---|---|---|---|
| 10,552,299 | B1 | 2/2020 | Surace et al. | |
| 10,942,837 | B2 | 3/2021 | Vidal et al. | |
| 11,042,472 | B2 | 6/2021 | Vidal et al. | |
| 2014/0075242 | A1 | 3/2014 | Dolinina et al. | |
| 2015/0212927 | A1* | 7/2015 | N'Gum | G06F 11/368<br>717/125 |
| 2018/0349256 | A1 | 12/2018 | Fong | |
| 2019/0179732 | A1 | 6/2019 | Venkatasubramanian et al. | |
| 2019/0213115 | A1 | 7/2019 | Takawale et al. | |
| 2019/0340512 | A1 | 11/2019 | Vidal et al. | |
| 2021/0173636 | A1* | 6/2021 | Kolar | G06F 8/71 |
| 2024/0303184 | A1* | 9/2024 | Liu | G06F 11/3684 |
| 2024/0338310 | A1* | 10/2024 | Bendert | G06F 11/3688 |
| 2025/0045190 | A1* | 2/2025 | Chen | G06F 11/3684 |

* cited by examiner

SYSTEM AND METHOD FOR DYNAMICALLY GENERATING AUTOMATION TEST SCRIPTS FOR SOFTWARE APPLICATIONS COMPRISING MULTIPLE VERSIONS

BACKGROUND

There exists a need for a system for dynamically generating automation test scripts for software applications comprising multiple versions.

BRIEF SUMMARY

Embodiments of the present invention address the above needs and/or achieve other advantages by providing apparatuses (e.g., a system, computer program product and/or other devices) and methods for dynamically generating automation test scripts for software applications comprising multiple versions. The system embodiments may comprise one or more memory devices having computer readable program code stored thereon, a communication device, and one or more processing devices operatively coupled to the one or more memory devices, wherein the one or more processing devices are configured to execute the computer readable program code to carry out the invention. In computer program product embodiments of the invention, the computer program product comprises at least one non-transitory computer readable medium comprising computer readable instructions for carrying out the invention. Computer implemented method embodiments of the invention may comprise providing a computing system comprising a computer processing device and a non-transitory computer readable medium, where the computer readable medium comprises configured computer program instruction code, such that when said instruction code is operated by said computer processing device, said computer processing device performs certain operations to carry out the invention.

In some embodiments, the present invention identifies a new version of a software code associated with a software application in a code repository in a software development environment, scans the new version of the software code, identifies new changes to the software code based on scanning the new version of the software code, analyzes the new changes via a Bayesian network to determine impact associated with the new changes, determines, via the Bayesian network, a first set of new changes from the new changes that have an impact on an automation base repository associated with testing the software code, identifies locators associated with the first set of new changes, via an Apriori algorithm, extracts values associated with the locators, dynamically creates a new version of a test repository corresponding to the new version in the code repository, and updates the new version of the test repository with the locators and the values of the locators.

In some embodiments, the present invention updates the automation base repository used for generating automation test scripts associated with the software application with the new version of the test repository and generates one or more automation test scripts for testing the new version of the software code based on the locators and the values of the locators in the base repository.

In some embodiments, the present invention automatically executes the one or more automation test scripts, determines that the execution of the one or more automation test scripts is successful, and updates results associated with successful execution of the one or more automation test scripts in a test management tool.

In some embodiments, the present invention updates the automation base repository used for generating automation test scripts associated with the software application with the new version of the test repository for every release cycle associated with the software application.

In some embodiments, the present invention continuously monitors the code repository associated with the software development environment to identify creation of the new version of the software code.

In some embodiments, the present invention continuously monitors version numbers in the code repository to determine a change in a version number from a previously captured instance to identify the creation of the new version of the software code.

In some embodiments, the present invention identifies the locators associated with the first set of new changes based on determining a set of locators associated with part of the software associated with the first set of new changes and sorting the locators from the set of locators that directly cause the first set of new changes, wherein remaining locators excluding the locators from the set of locators, via the Apriori algorithm are not directly associated with causing the first set of new changes.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Figure 1:
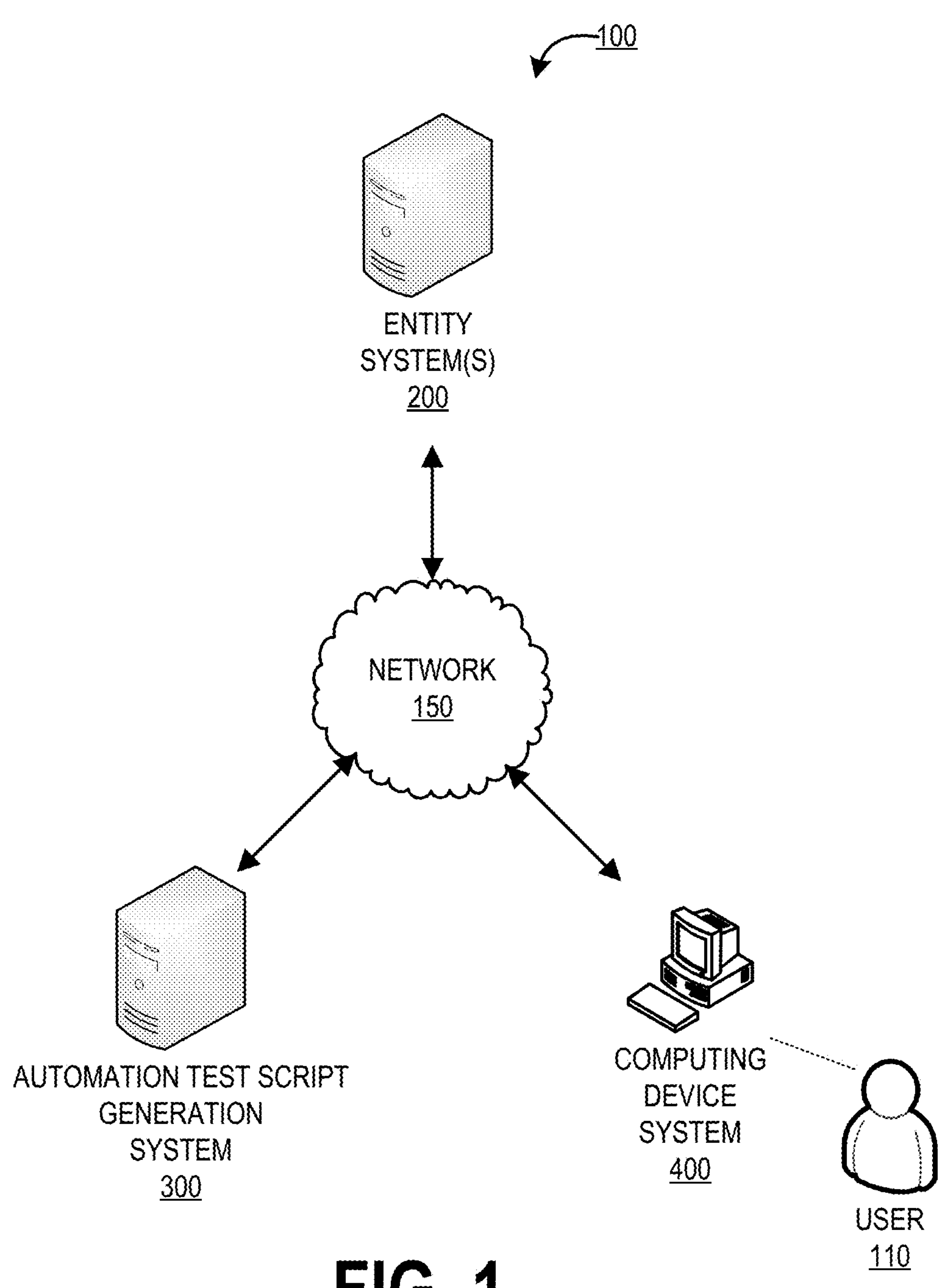
Figure 2:
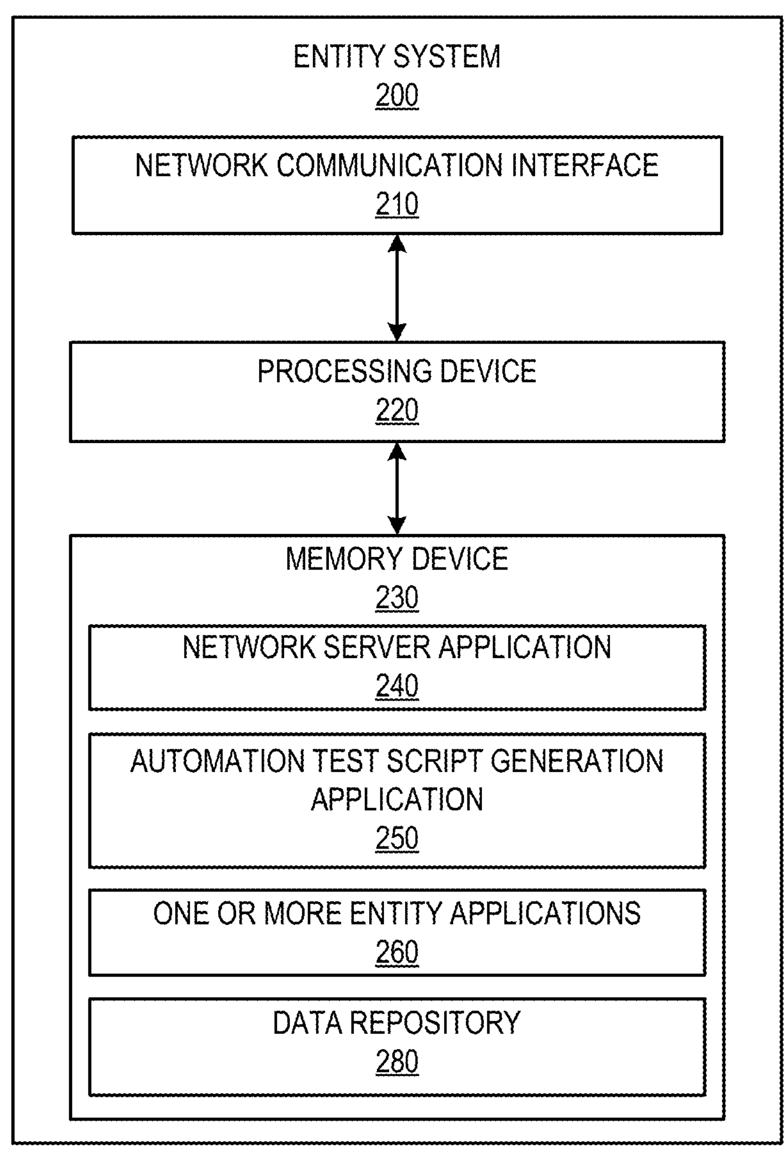
Figure 3:
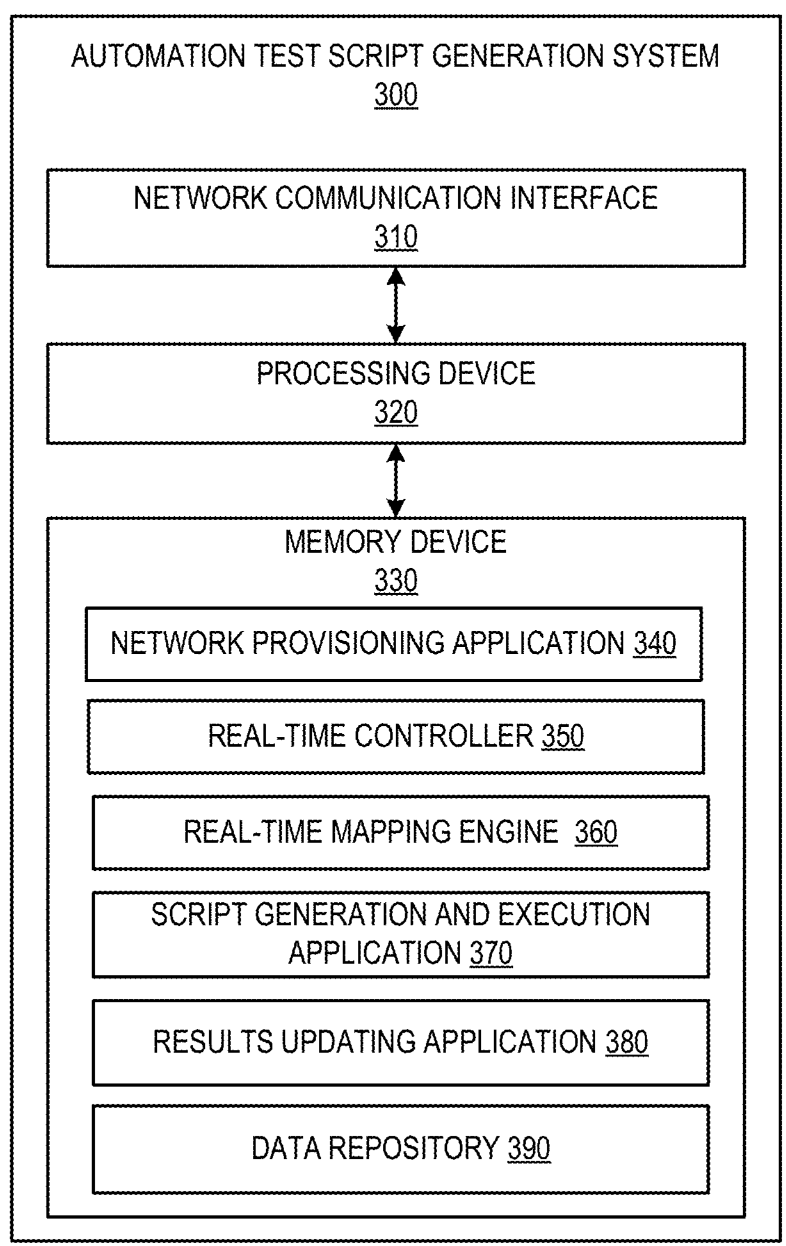
Figure 4:
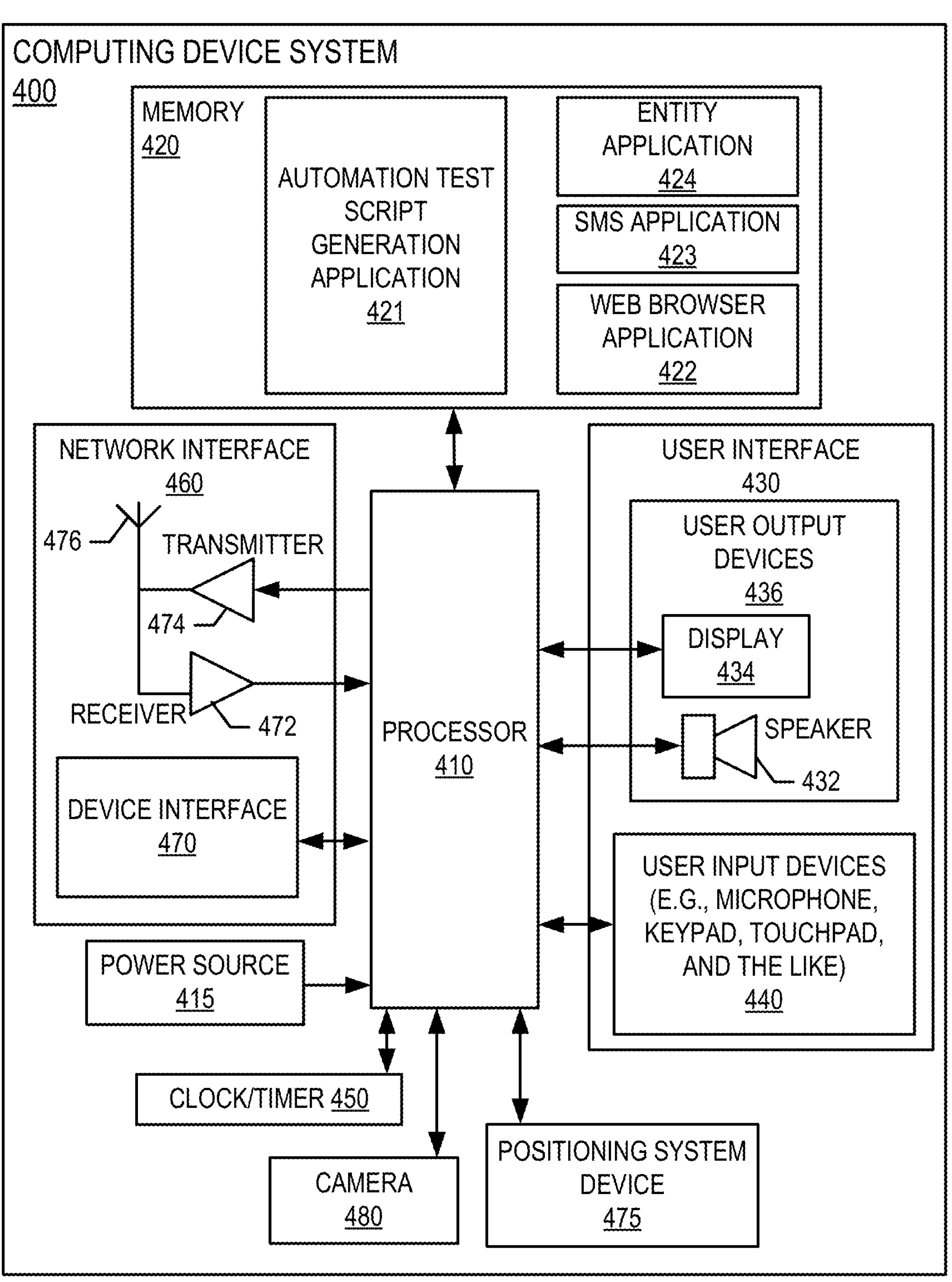
Figure 5A:
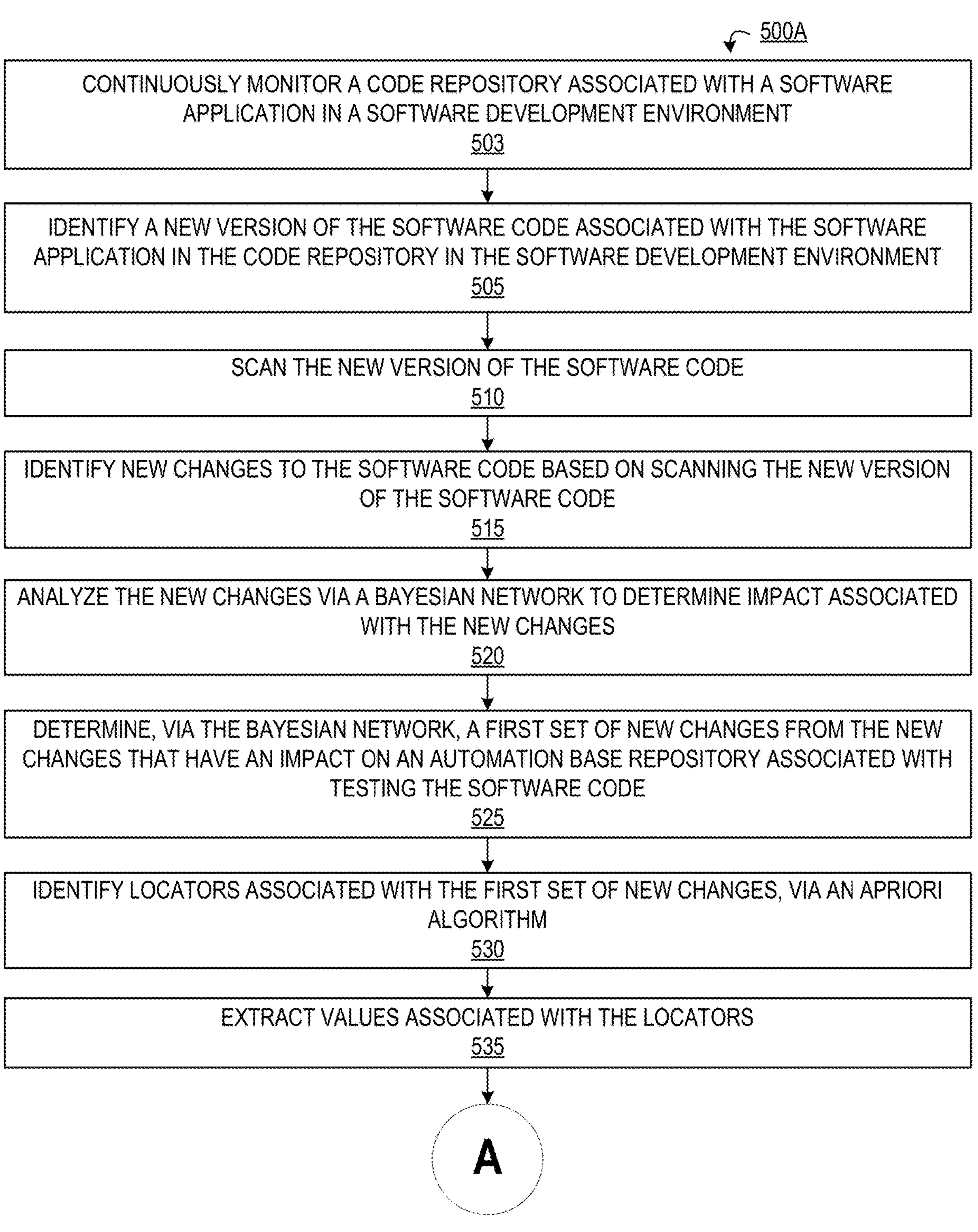
Figure 5B:
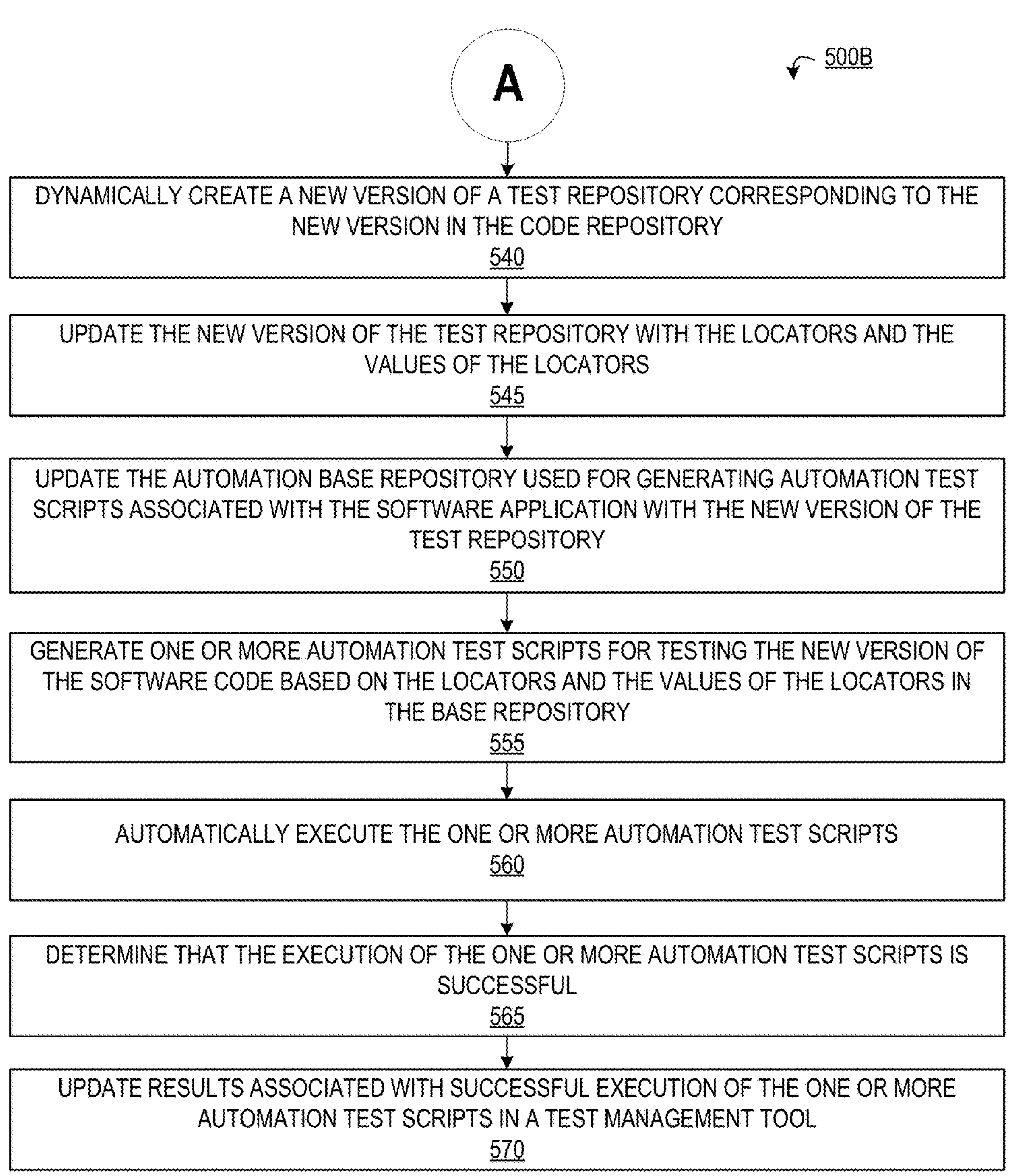
Figure 6:
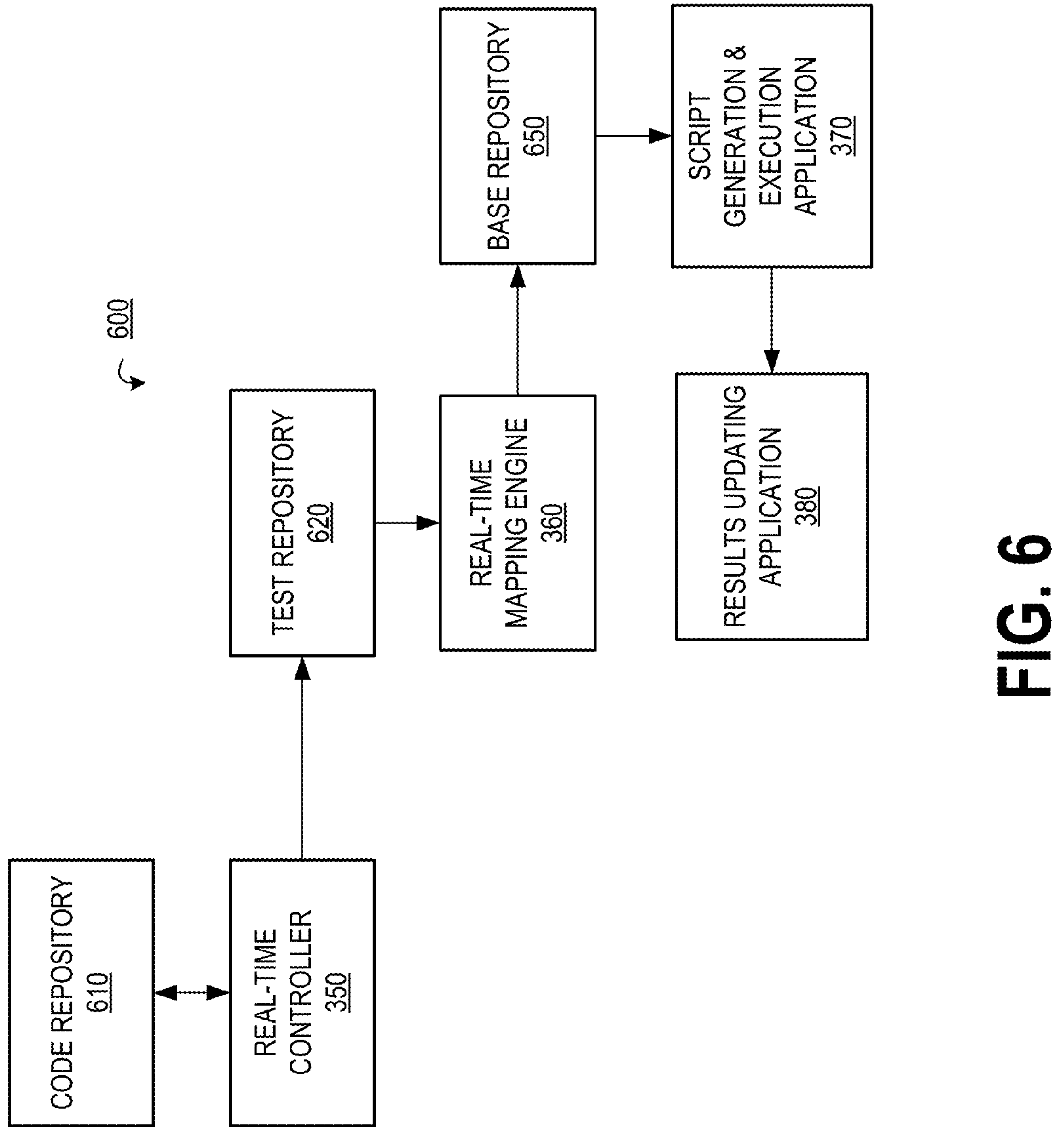
Figure 7:
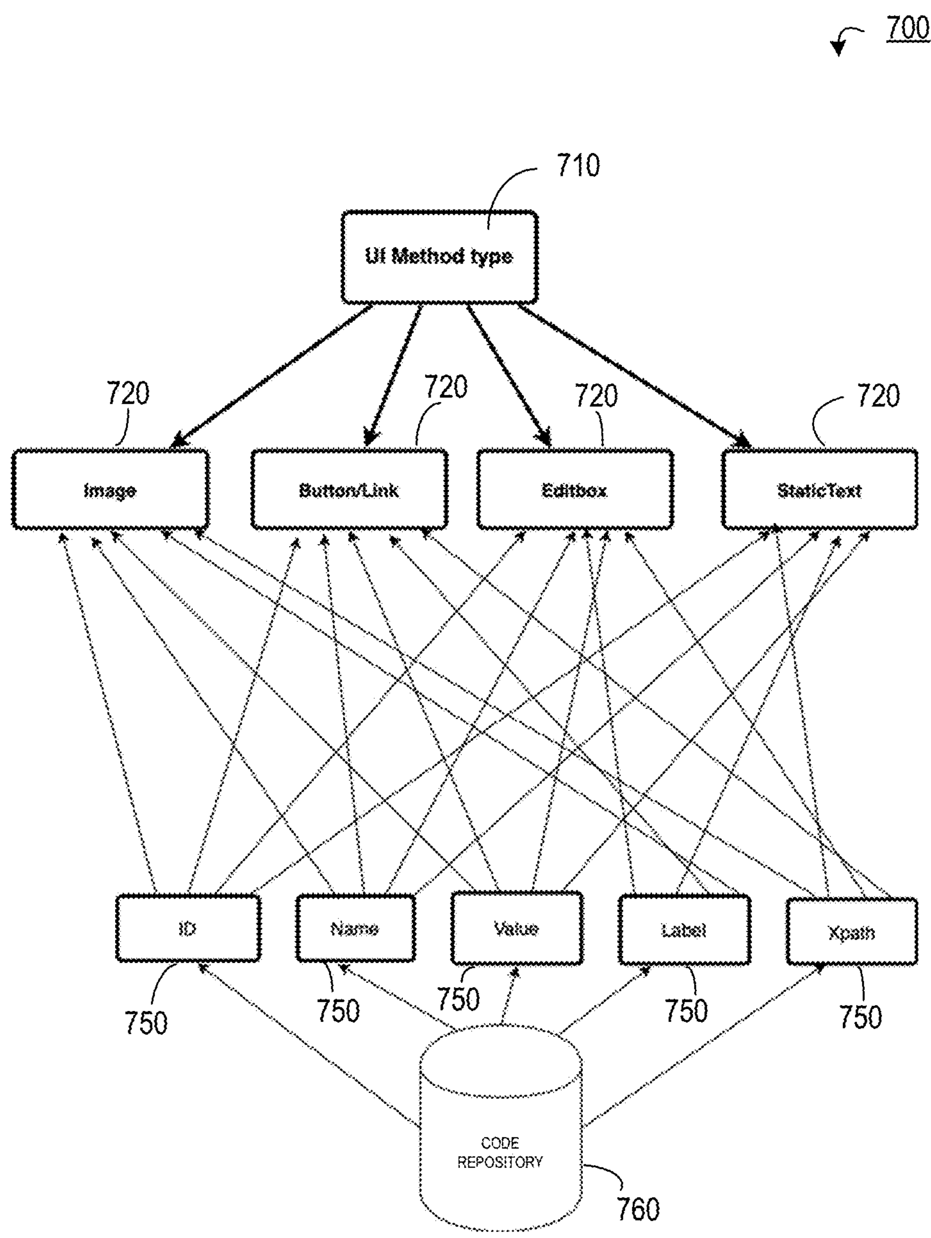

Having thus described embodiments of the invention in general terms, reference will now be made the accompanying drawings, wherein:

FIG. 1 provides a block diagram illustrating a system environment for dynamically generating automation test scripts for software applications comprising multiple versions, in accordance with an embodiment of the invention;

FIG. 2 provides a block diagram illustrating the entity system 200 of FIG. 1, in accordance with an embodiment of the invention;

FIG. 3 provides a block diagram illustrating an automation test script generation system 300 of FIG. 1, in accordance with an embodiment of the invention;

FIG. 4 provides a block diagram illustrating the computing device system 400 of FIG. 1, in accordance with an embodiment of the invention;

FIGS. 5A and 5B provide a process flow for dynamically generating automation test scripts for software applications comprising multiple versions, in accordance with an embodiment of the invention;

FIG. 6 provides a block diagram illustrating the process of dynamically generating automation test scripts for software applications comprising multiple versions, in accordance with an embodiment of the invention; and FIG. 7 illustrates an example for identifying one or more relevant locators used for generation of automation test scripts by a real-time controller in the automation test script generation system 300, in accordance with an embodiment of the invention.

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein. Furthermore, when it is said herein that something is "based on" something else, it may be based on one or more other things as well. In other words, unless expressly indicated otherwise, as used herein "based on" means "based at least in part on" or "based at least partially on." Like numbers refer to like elements throughout.

As described herein, the term "entity" may be any organization that creates, manages, develops, provides, maintains, and/or uses one or more applications (e.g., web applications, mobile applications, or the like) to perform one or more activities. In some embodiments, the entity may be a financial institution which may include any financial institutions such as commercial banks, thrifts, federal and state savings banks, savings and loan associations, credit unions, investment companies, insurance companies and the like. In some embodiments, the entity may be a non-financial institution.

Many of the example embodiments and implementations described herein contemplate interactions engaged in by a user with a computing device and/or one or more communication devices and/or secondary communication devices. A "user", as referenced herein, may refer to an entity or individual that has the ability and/or authorization to access and use one or more applications, systems, servers, and/or devices provided by the entity and/or the system of the present invention. Furthermore, as used herein, the term "user computing device" or "mobile device" may refer to mobile phones, computing devices, tablet computers, wearable devices, smart devices and/or any portable electronic device capable of receiving and/or storing data therein.

A "user interface" is any device or software that allows a user to input information, such as commands or data, into a device, or that allows the device to output information to the user. For example, the user interface includes a graphical user interface (GUI) or an interface to input computer-executable instructions that direct a processing device to carry out specific functions. The user interface typically employs certain input and output devices to input data received from a user or to output data to a user. These input and output devices may include a display, mouse, keyboard, button, touchpad, touch screen, microphone, speaker, LED, light, joystick, switch, buzzer, bell, and/or other user input/output device for communicating with one or more users.

Typically, an entity may develop 'n' number of entity applications that perform one or more organizational activities associated with the entity. During development of these entity applications, the software code associated with the entity applications may move through different stages of software development lifecycle (SDLC) and multiple software development lifecycle environments which may comprise development environment, testing environment, user acceptance testing environment, real-time production environment, and/or the like. The entity applications are typically developed and provided to users of the entity applications over various release cycles as different versions, where in each release cycle pieces of software code associated with entity application requirements (e.g., functionalities of applications) are developed in development environment, tested in testing environment, and then deployed to a real-time production environment. During testing phase, a version corresponding to the requirements associated with a release cycle undergoes testing, where automation testing may be used. However, if such automation testing is not properly performed and/or validated, the version of the entity application that is deployed into real-time production environment may fail and cause disruptions to the users. Automation testing that is being used today is error prone and upon failure, requires repetition of the entire process multiple times, thereby overall efficiency of all the servers. As such, there exists a need for a system that can dynamically generate automation test scripts for 'n' number of entity applications and can successfully perform automation testing on multiple versions of the entity applications that are being developed in parallel. The system of the present invention solves this technical problem as discussed in detail below.

FIG. 1 provides a block diagram illustrating a system environment 100 for dynamically generating automation test scripts for software applications comprising multiple versions, in accordance with an embodiment of the invention. As illustrated in FIG. 1, the environment 100 includes an automation test script generation system 300, entity system 200, and a computing device system 400. One or more users 110 may be included in the system environment 100, where the users 110 interact with the other entities of the system environment 100 via a user interface of the computing device system 400. In some embodiments, the one or more user(s) 110 of the system environment 100 may be employees of an entity associated with the entity system 200 (e.g., software engineer, application developer, application tester, and/or the like). In some embodiments, the one or more user(s) 110 of the system environment 100 may be customers of the entity associated with the entity system 200. In some embodiments, the one or more user(s) 110 of the system environment 100 may be potential customers of the entity associated with the entity system 200.

The entity system(s) 200 may be any system owned or otherwise controlled by an entity to support or perform one or more process steps described herein. In some embodiments, the entity is a financial institution. In some embodiments, the entity is a non-financial institution.

The automation test script generation system 300 is a system of the present invention for performing one or more process steps described herein. In some embodiments, the automation test script generation system 300 may be an independent system. In some embodiments, the automation test script generation system 300 may be a part of the entity system 200.

The automation test script generation system 300, the entity system 200, and/or the computing device system 400 may be in network communication across the system environment 100 through the network 150. The network 150 may include a local area network (LAN), a wide area network (WAN), and/or a global area network (GAN). The network 150 may provide for wireline, wireless, or a combination of wireline and wireless communication between devices in the network. In one embodiment, the network 150 includes the Internet. In general, the automation test script generation system 300 is configured to communicate information or instructions with the entity system 200, and/or the computing device system 400 across the network 150.

The computing device system 400 may be a computing device of the user 110. In general, the computing device system 400 communicates with the user 110 via a user interface of the computing device system 400, and in turn is configured to communicate information or instructions with the automation test script generation system 300 and/or entity system 200 across the network 150.

FIG. 2 provides a block diagram illustrating the entity system 200, in greater detail, in accordance with embodiments of the invention. As illustrated in FIG. 2, in one embodiment of the invention, the entity system 200 includes one or more processing devices 220 operatively coupled to a network communication interface 210 and a memory device 230. In certain embodiments, the entity system 200 is operated by an entity, such as a financial institution, while in other embodiments, the entity system 200 is operated by an entity other than a financial institution.

It should be understood that the memory device 230 may include one or more databases or other data structures/repositories. The memory device 230 also includes computer-executable program code that instructs the processing device 220 to operate the network communication interface 210 to perform certain communication functions of the entity system 200 described herein. For example, in one embodiment of the entity system 200, the memory device 230 includes, but is not limited to, a network server application 240, an automation test script generation application 250, one or more entity applications 260, and a data repository 280. The computer-executable program code of the network server application 240, the automation test script generation application 250, and the one or more entity applications 260 to perform certain logic, data-extraction, and data-storing functions of the entity system 200 described herein, as well as communication functions of the entity system 200.

The network server application 240, the automation test script generation application 250, and the one or more entity applications 260 are configured to store data in the data repository 280 or to use the data stored in the data repository 280 when communicating through the network communication interface 210 with the automation test script generation system 300, and the computing device system 400 to perform one or more process steps described herein. In some embodiments, the entity system 200 may receive instructions from the automation test script generation system 300 via the automation test script generation application 250 to perform certain operations. The automation test script generation application 250 may be provided by the automation test script generation system 300.

FIG. 3 provides a block diagram illustrating the automation test script generation system 300 in greater detail, in accordance with embodiments of the invention. As illustrated in FIG. 3, in one embodiment of the invention, the automation test script generation system 300 includes one or more processing devices 320 operatively coupled to a network communication interface 310 and a memory device 330. In certain embodiments, the automation test script generation system 300 is operated by an entity, such as a financial institution, while in other embodiments, the automation test script generation system 300 is operated by an entity other than a financial institution. In some embodiments, the automation test script generation system 300 is owned or operated by the entity of the entity system 200. In some embodiments, the automation test script generation system 300 may be an independent system. In alternate embodiments, the automation test script generation system 300 may be a part of the entity system 200.

It should be understood that the memory device 330 may include one or more databases or other data structures/repositories. The memory device 330 also includes computer-executable program code that instructs the processing device 320 to operate the network communication interface 310 to perform certain communication functions of the automation test script generation system 300 described herein. For example, in one embodiment of the automation test script generation system 300, the memory device 330 includes, but is not limited to, a network provisioning application 340, a real-time controller 350, a real-time mapping engine 360, a script generation and execution application 370, an update application 380, and a data repository 390 comprising data processed or accessed by one or more applications in the memory device 330. The computer-executable program code of the network provisioning application 340, the real-time controller 350, the real-time mapping engine 360, the script generation and execution application 370, and the update application 380 may instruct the processing device 320 to perform certain logic, data-processing, and data-storing functions of the automation test script generation system 300 described herein, as well as communication functions of the automation test script generation system 300.

The network provisioning application 340, the real-time controller 350, the real-time mapping engine 360, the script generation and execution application 370, and the update application 380 are configured to invoke or use the data in the data repository 390 when communicating through the network communication interface 310 with the entity system 200, and the computing device system 400. In some embodiments, the network provisioning application 340, the real-time controller 350, the real-time mapping engine 360, the script generation and execution application 370, and the update application 380 may store the data extracted or received from the entity system 200 and the computing device system 400 in the data repository 390. In some embodiments, the network provisioning application 340, the real-time controller 350, the real-time mapping engine 360, the script generation and execution application 370, and the update application 380 may be a part of a single application. One or more processes performed by the network provisioning application 340, the real-time controller 350, the real-time mapping engine 360, the script generation and execution application 370, and the update application 380 are described in detail below.

FIG. 4 provides a block diagram illustrating a computing device system 400 of FIG. 1 in more detail, in accordance with embodiments of the invention. However, it should be understood that the computing device system 400 is merely illustrative of one type of computing device system that may benefit from, employ, or otherwise be involved with embodiments of the present invention and, therefore, should not be taken to limit the scope of embodiments of the present invention. The computing devices may include any one of portable digital assistants (PDAs), pagers, mobile televisions, mobile phone, entertainment devices, desktop computers, workstations, laptop computers, cameras, video recorders, audio/video player, radio, GPS devices, wearable devices, Internet-of-things devices, augmented reality devices, virtual reality devices, automated teller machine devices, electronic kiosk devices, or any combination of the aforementioned.

Some embodiments of the computing device system 400 include a processor 410 communicably coupled to such devices as a memory 420, user output devices 436, user input devices 440, a network interface 460, a power source 415, a clock or other timer 450, a camera 480, and a positioning system device 475. The processor 410, and other processors described herein, generally include circuitry for implementing communication and/or logic functions of the computing device system 400. For example, the processor 410 may include a digital signal processor device, a microprocessor device, and various analog to digital converters, digital to analog converters, and/or other support circuits. Control and signal processing functions of the computing device system 400 are allocated between these devices according to their respective capabilities. The processor 410 thus may also include the functionality to encode and interleave messages and data prior to modulation and transmission. The processor 410 can additionally include an internal data modem. Further, the processor 410 may include functionality to operate one or more software programs, which may be stored in the memory 420. For example, the processor 410 may be capable of operating a connectivity program, such as a web browser application 422. The web browser application 422 may then allow the computing device system 400 to transmit and receive web content, such as, for example, location-based content and/or other web page content, according to a Wireless Application Protocol (WAP), Hypertext Transfer Protocol (HTTP), and/or the like.

The processor 410 is configured to use the network interface 460 to communicate with one or more other devices on the network 150. In this regard, the network interface 460 includes an antenna 476 operatively coupled to a transmitter 474 and a receiver 472 (together a "transceiver"). The processor 410 is configured to provide signals to and receive signals from the transmitter 474 and receiver 472, respectively. The signals may include signaling information in accordance with the air interface standard of the applicable cellular system of the wireless network 150. In this regard, the computing device system 400 may be configured to operate with one or more air interface standards, communication protocols, modulation types, and access types. By way of illustration, the computing device system 400 may be configured to operate in accordance with any of a number of first, second, third, and/or fourth-generation communication protocols and/or the like. For example, the computing device system 400 may be configured to operate in accordance with second-generation (2G) wireless communication protocols IS-136 (time division multiple access (TDMA)), GSM (global system for mobile communication), and/or IS-95 (code division multiple access (CDMA)), or with third-generation (3G) wireless communication protocols, such as Universal Mobile Telecommunications System (UMTS), CDMA2000, wideband CDMA (WCDMA) and/or time division-synchronous CDMA (TD-SCDMA), with fourth-generation (4G) wireless communication protocols, with LTE protocols, with 4GPP protocols and/or the like. The computing device system 400 may also be configured to operate in accordance with non-cellular communication mechanisms, such as via a wireless local area network (WLAN) or other communication/data networks.

As described above, the computing device system 400 has a user interface that is, like other user interfaces described herein, made up of user output devices 436 and/or user input devices 440. The user output devices 436 include a display 430 (e.g., a liquid crystal display or the like) and a speaker 432 or other audio device, which are operatively coupled to the processor 410.

The user input devices 440, which allow the computing device system 400 to receive data from a user such as the user 110 may include any of a number of devices allowing the computing device system 400 to receive data from the user 110, such as a keypad, keyboard, touch-screen, touchpad, microphone, mouse, joystick, other pointer device, button, soft key, and/or other input device(s). The user interface may also include a camera 480, such as a digital camera.

The computing device system 400 may also include a positioning system device 475 that is configured to be used by a positioning system to determine a location of the computing device system 400. For example, the positioning system device 475 may include a GPS transceiver. In some embodiments, the positioning system device 475 is at least partially made up of the antenna 476, transmitter 474, and receiver 472 described above. For example, in one embodiment, triangulation of cellular signals may be used to identify the approximate or exact geographical location of the computing device system 400. In other embodiments, the positioning system device 475 includes a proximity sensor or transmitter, such as an RFID tag, that can sense or be sensed by devices known to be located proximate a merchant or other location to determine that the computing device system 400 is located proximate these known devices.

The computing device system 400 further includes a power source 415, such as a battery, for powering various circuits and other devices that are used to operate the computing device system 400. Embodiments of the computing device system 400 may also include a clock or other timer 450 configured to determine and, in some cases, communicate actual or relative time to the processor 410 or one or more other devices.

The computing device system 400 also includes a memory 420 operatively coupled to the processor 410. As used herein, memory includes any computer readable medium (as defined herein below) configured to store data, code, or other information. The memory 420 may include volatile memory, such as volatile Random Access Memory (RAM) including a cache area for the temporary storage of data. The memory 420 may also include non-volatile memory, which can be embedded and/or may be removable. The non-volatile memory can additionally or alternatively include an electrically erasable programmable read-only memory (EEPROM), flash memory or the like.

The memory 420 can store any of a number of applications which comprise computer-executable instructions/code executed by the processor 410 to implement the functions of the computing device system 400 and/or one or more of the process/method steps described herein. For example, the memory 420 may include such applications as a conventional web browser application 422, an automation test script generation application 421, an entity application 424, or the like. These applications also typically instructions to a graphical user interface (GUI) on the display 430 that allows the user 110 to interact with the entity system 200, the automation test script generation system 300, and/or other devices or systems. The memory 420 of the computing device system 400 may comprise a Short Message Service (SMS) application 423 configured to send, receive, and store data, information, communications, alerts, and the like via the wireless network 150.

The memory 420 can also store any of a number of pieces of information, and data, used by the computing device system 400 and the applications and devices that make up the computing device system 400 or are in communication with the computing device system 400 to implement the functions of the computing device system 400 and/or the other systems described herein.

FIGS. 5A and 5B provide a process flow for dynamically generating automation test scripts for software applications comprising multiple versions, in accordance with an embodiment of the invention. As shown in block 503, the system continuously monitors a code repository associated with a software application in a software development environment. The code repository may be a repository with a version control feature, where software code that is developed for every release cycle of the software application is stored in the code repository as a separate version. In some embodiments, the software code developed for every new feature associated with the software application is stored as a separate version in the code repository. Each version that is being stored in the code repository is assigned a unique version number. The version numbers are incremented for every new version that is added to the code repository via the version control feature. In some embodiments, the version number may be based on the release cycle. In some embodiments, the system may continuously monitor version numbers in the code repository to determine a change in a version number from a previously captured instance to identify the creation of the new version of the software code.

As shown in block 505, the system identifies a new version of the software code associated with the software application in the code repository in the software development environment. The new version of the software code may be associated with new requirements associated with a release cycle. In some embodiments, the new version may comprise software code associated with a feature that is based on previously developed features stored in existing versions of the code repository. For example, the new version may be associated with an additional "button" in an existing page of a mobile application. In some embodiments, the new version may comprise software code associated with a feature that is new and is not based on any previously developed features stored in existing version of the code repository. For example, the new version may be associated with a new page in a mobile application. It should be understood that the examples provided herein are for explanatory purposes only and in no way delineate the scope of the present invention. The system may identify the new version based identifying a new version number in the code repository compared to a previously captured version number at a previous instance.

As shown in block 510, the system scans the new version of the software code. The system may comprise the new version of the software code to identify new changes (e.g., modification of existing lines of code, addition of new lines of code, deletion of existing lines of code, and/or the like) in the new version of the software code. As shown in block 515, the system identifies new changes to the software code based on scanning the new version of the software code. In some embodiments, the system may compare the software code in the new version with the software code in the previous version to identify the new changes.

As shown in block 520, the system analyzes the new changes via a Bayesian network to determine impact associated with the new changes. Bayesian network may be a probabilistic graphical model that represents a set of variables and their conditional dependencies via a directed acyclic graph. Bayesian network may identify an event (e.g., new change to the software code) and predicting likelihood of several known cases being the contributing factor for the change (e.g., pieces of code that are associated with or causing the change that have an impact). For example, the Bayesian network may identify new changes and may identify all pieces of the software code in the new version that are associated with and/or causing the new changes.

As shown in block 525, the system determines, via the Bayesian network, a first set of new changes from the new changes that have an impact on an automation base repository associated with testing the software code. In some embodiments, the system may further use the Bayesian network to analyze the pieces of software that may have an impact on the automation base repository, where the automation base repository comprises one or more attributes and values of the attributes from the software code that are used to generate automation test scripts for testing the new version of the software code before it is deployed to a production environment where the software application is available for end users. In some embodiments, there may be 'X' number of changes to the software code in the new version and the system may determine that only 'Y' of 'X' number of changes may have an impact on the automation base repository. For example, the system may determine that a new change that is not based on any of the previously developed features of an entity application may not have any impact on the automation base repository and may isolate such changes. In some embodiments, the system may place such identified changes that have an impact on the automation base repository in an array before passing to the Apriori algorithm.

As shown in block 530, the system identifies locators associated with the first set of new changes, via an Apriori algorithm. Apriori algorithm may be used to identify the most relevant and meaningful associations in a dataset. The system may identify the locators based on determining a set of locators associated with part of the software associated with the first set of new changes and sorting the locators from the set of locators that directly cause the first set of new changes, wherein remaining locators excluding the locators from the set of locators, via the Apriori algorithm are not directly associated with causing the first set of new changes. As shown in block 535, the system extracts values associated with the locators.

As example for illustrating the steps described in blocks 520 through 530 is shown in FIG. 7. FIG. 7 illustrates an example for identifying one or more relevant locators used for generation of automation test scripts by the real-time controller 350 in the automation test script generation system 300, in accordance with an embodiment of the invention. The real-time controller 350 may utilize the Bayesian network and the Apriori algorithm for performing the steps described herein. As shown, the UI method type 710 comprising several lines of code may be a new change identified by the system as described in block 520. The system via the Bayesian network may determine that elements 720 that are associated with the new change may have an impact on the automation base repository (e.g., Image, button/link, edit box, static text). The system may further identify, via the Apriori algorithm, all locators (also referred to as attributes) associated with elements and may sort the locators to segregate those locators 750 that are directly related to the new change (e.g., ID, name, value, label, Xpath, or the like). The system may then directly extract values of these locators 720 from the code repository 760, thereby reducing the chances of having outdated values in the automation base repository while generating the automation test scripts.

As shown in block 540, the system dynamically creates a new version of a test repository corresponding to the new version in the code repository. As shown in block 545, the system updates the new version of the test repository with the locators and the values of the locators. The system may then place the locators and the values associated with the locators in the new version of the test repository that is created for the new version of the code repository identified in block 505. The system may repeat this process and create a version of the test repository every time a new version is identified in the code repository.

As shown in block 550, the system updates the automation base repository used for generating automation test scripts associated with the software application with the new version of the test repository. The system may maintain an automation base repository that is linked with generation of automation test scripts and update the automation base repository with the latest version of the test repository. As shown in block 555, the system generates one or more automation test scripts for testing the new version of the software code based on the locators and the values of the locators in the base repository. As shown in block 560, the system automatically executes the one or more automation test scripts. As shown in block 565, the system determines that the execution of the one or more automation test scripts is successful. As shown in block 570, the system updates results associated with successful execution of the one or more automation test scripts in a test management tool.

FIG. 6 provides a block diagram illustrating the process of dynamically generating automation test scripts for software applications comprising multiple versions, in accordance with an embodiment of the invention. As shown, for every version of the code repository 610, the real-time controller 350 creates a version of a test repository 620 with most relevant locators and values of the locators that are associated with the new changes in the new version of the software code in the code repository 610 as described above in FIG. 5 and FIG. 7. The code repository 610 and the test repository 620 may be part of the data repository 290, where the code repository 610 and the test repository 620 may be associated with the one or more entity applications 360 that are being developed by the entity associated with the entity system 200. The real-time mapping engine 360 may update the automation base repository 650 with the latest version of the test repository 620 based on one or more rules. The script generation and execution application 370 may generate and execute automation test scripts based on the locators and values of the locators in the automation base repository 650. The results updating application 380 may determine if the execution of the automation test scripts is successful and may update the results in a test management tool. The system may keep the automation base repository up-to-date by identifying the most relevant locators associated with the new changes and extracting values of the most relevant locators directly from the code repository, thereby increasing the efficiency of the system and also decreasing the chances of failures in the execution of automation test scripts and repetition of one or more steps described above which may result in consumption of unnecessary processing power of the system.

As will be appreciated by one of skill in the art, the present invention may be embodied as a method (including, for example, a computer-implemented process, a business process, and/or any other process), apparatus (including, for example, a system, machine, device, computer program product, and/or the like), or a combination of the foregoing. Accordingly, embodiments of the present invention may take the form of an entirely hardware embodiment, an entirely software embodiment (including firmware, resident software, micro-code, and the like), or an embodiment combining software and hardware aspects that may generally be referred to herein as a "system." Furthermore, embodiments of the present invention may take the form of a computer program product on a computer-readable medium having computer-executable program code embodied in the medium.

Any suitable transitory or non-transitory computer readable medium may be utilized. The computer readable medium may be, for example but not limited to, an electronic, magnetic, optical, electromagnetic, infrared, or semiconductor system, apparatus, or device. More specific examples of the computer readable medium include, but are not limited to, the following: an electrical connection having one or more wires; a tangible storage medium such as a portable computer diskette, a hard disk, a random access memory (RAM), a read-only memory (ROM), an erasable programmable read-only memory (EPROM or Flash memory), a compact disc read-only memory (CD-ROM), or other optical or magnetic storage device.

In the context of this document, a computer readable medium may be any medium that can contain, store, communicate, or transport the program for use by or in connection with the instruction execution system, apparatus, or device. The computer usable program code may be transmitted using any appropriate medium, including but not limited to the Internet, wireline, optical fiber cable, radio frequency (RF) signals, or other mediums.

Computer-executable program code for carrying out operations of embodiments of the present invention may be written in an object oriented, scripted or unscripted programming language. However, the computer program code for carrying out operations of embodiments of the present invention may also be written in conventional procedural programming languages, such as the "C" programming language or similar programming languages.

Embodiments of the present invention are described above with reference to flowchart illustrations and/or block diagrams of methods, apparatus (systems), and computer program products. It will be understood that each block of the flowchart illustrations and/or block diagrams, and/or combinations of blocks in the flowchart illustrations and/or block diagrams, can be implemented by computer-executable program code portions. These computer-executable program code portions may be provided to a processor of a general purpose computer, special purpose computer, or other programmable data processing apparatus to produce a particular machine, such that the code portions, which execute via the processor of the computer or other programmable data processing apparatus, create mechanisms for implementing the functions/acts specified in the flowchart and/or block diagram block or blocks.

These computer-executable program code portions may also be stored in a computer-readable memory that can direct a computer or other programmable data processing apparatus to function in a particular manner, such that the code portions stored in the computer readable memory produce an article of manufacture including instruction mechanisms which implement the function/act specified in the flowchart and/or block diagram block(s).

The computer-executable program code may also be loaded onto a computer or other programmable data processing apparatus to cause a series of operational steps to be performed on the computer or other programmable apparatus to produce a computer-implemented process such that the code portions which execute on the computer or other programmable apparatus provide steps for implementing the functions/acts specified in the flowchart and/or block diagram block(s). Alternatively, computer program implemented steps or acts may be combined with operator or human implemented steps or acts in order to carry out an embodiment of the invention.

As the phrase is used herein, a processor may be "configured to" perform a certain function in a variety of ways, including, for example, by having one or more general-purpose circuits perform the function by executing particular computer-executable program code embodied in computer-readable medium, and/or by having one or more application-specific circuits perform the function.

Embodiments of the present invention are described above with reference to flowcharts and/or block diagrams. It will be understood that steps of the processes described herein may be performed in orders different than those illustrated in the flowcharts. In other words, the processes represented by the blocks of a flowchart may, in some embodiments, be in performed in an order other that the order illustrated, may be combined or divided, or may be performed simultaneously. It will also be understood that the blocks of the block diagrams illustrated, in some embodiments, merely conceptual delineations between systems and one or more of the systems illustrated by a block in the block diagrams may be combined or share hardware and/or software with another one or more of the systems illustrated by a block in the block diagrams. Likewise, a device, system, apparatus, and/or the like may be made up of one or more devices, systems, apparatuses, and/or the like. For example, where a processor is illustrated or described herein, the processor may be made up of a plurality of microprocessors or other processing devices which may or may not be coupled to one another. Likewise, where a memory is illustrated or described herein, the memory may be made up of a plurality of memory devices which may or may not be coupled to one another.

While certain exemplary embodiments have been described and shown in the accompanying drawings, it is to be understood that such embodiments are merely illustrative of, and not restrictive on, the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations and modifications of the just described embodiments can be configured without departing from the scope and spirit of the invention. Therefore, it is to be understood that, within the scope of the appended claims, the invention may be practiced other than as specifically described herein.

The invention claimed is:

1. A system for dynamically generating automation test scripts for software applications comprising multiple versions, comprising:
- at least one processing device;
- at least one memory device; and
- a module stored in the at least one memory device comprising executable instructions that when executed by the at least one processing device, cause the at least one processing device to:
  - identify a new version of a software code associated with a software application in a code repository in a software development environment;
  - scan the new version of the software code;
  - identify new changes to the software code based on scanning the new version of the software code;
  - analyze the new changes via a Bayesian network to determine impact associated with the new changes;
  - determine, via the Bayesian network, a first set of new changes from the new changes that have an impact on an automation base repository associated with testing the software code;
  - identify locators associated with the first set of new changes, via an Apriori algorithm;
  - extract values associated with the locators;
  - dynamically create a new version of a test repository corresponding to the new version in the code repository;
  - update the new version of the test repository with the locators and the values of the locators;
  - update the automation base repository used for generating automation test scripts associated with the software application with the new version of the test repository; and
  - generate one or more automation test scripts for testing the new version of the software code based on the locators and the values of the locators in the base repository.

2. The system according to claim 1, wherein the executable instructions cause the at least one processing device to:
- automatically execute the one or more automation test scripts;
- determine that the execution of the one or more automation test scripts is successful; and
- update results associated with successful execution of the one or more automation test scripts in a test management tool.

3. The system according to claim 1, wherein the executable instructions cause the at least one processing device to update the automation base repository used for generating automation test scripts associated with the software application with the new version of the test repository for every release cycle associated with the software application.

4. The system according to claim 1, wherein the executable instructions cause the at least one processing device to continuously monitor the code repository associated with the software development environment to identify creation of the new version of the software code.

5. The system according to claim 4, wherein the executable instructions cause the at least one processing device to continuously monitor version numbers in the code repository to determine a change in a version number from a previously captured instance to identify the creation of the new version of the software code.

6. The system according to claim 1, wherein the executable instructions cause the at least one processing device to identify the locators associated with the first set of new changes based on:
- determining a set of locators associated with part of the software associated with the first set of new changes; and
- sorting the locators from the set of locators that directly cause the first set of new changes, wherein remaining locators excluding the locators from the set of locators, via the Apriori algorithm are not directly associated with causing the first set of new changes.

7. A computer program product for dynamically generating automation test scripts for software applications comprising multiple versions, comprising a non-transitory computer-readable storage medium having computer-executable instructions for:
- identifying a new version of a software code associated with a software application in a code repository in a software development environment;
- scanning the new version of the software code;

identifying new changes to the software code based on scanning the new version of the software code;

analyzing the new changes via a Bayesian network to determine impact associated with the new changes;

determining, via the Bayesian network, a first set of new changes from the new changes that have an impact on an automation base repository associated with testing the software code;

identifying locators associated with the first set of new changes, via an Apriori algorithm;

extracting values associated with the locators;

dynamically creating a new version of a test repository corresponding to the new version in the code repository;

updating the new version of the test repository with the locators and the values of the locators;

updating the automation base repository used for generating automation test scripts associated with the software application with the new version of the test repository; and generating one or more automation test scripts for testing the new version of the software code based on the locators and the values of the locators in the base repository.

8. The computer program product according to claim 7, wherein the non-transitory computer-readable storage medium comprises computer-executable instructions for:

automatically executing the one or more automation test scripts;

determining that the execution of the one or more automation test scripts is successful; and updating results associated with successful execution of the one or more automation test scripts in a test management tool.

9. The computer program product according to claim 7, wherein the non-transitory computer-readable storage medium comprises computer-executable instructions for updating the automation base repository used for generating automation test scripts associated with the software application with the new version of the test repository for every release cycle associated with the software application.

10. The computer program product according to claim 7, wherein the non-transitory computer-readable storage medium comprises computer-executable instructions for continuously monitoring the code repository associated with the software development environment to identify creation of the new version of the software code.

11. The computer program product according to claim 10, wherein the non-transitory computer-readable storage medium comprises computer-executable instructions for continuously monitoring version numbers in the code repository to determine a change in a version number from a previously captured instance to identify the creation of the new version of the software code.

12. The computer program product according to claim 7, wherein the non-transitory computer-readable storage medium comprises computer-executable instructions for identifying the locators associated with the first set of new changes based on:

determining a set of locators associated with part of the software associated with the first set of new changes; and sorting the locators from the set of locators that directly cause the first set of new changes, wherein remaining locators excluding the locators from the set of locators, via the Apriori algorithm are not directly associated with causing the first set of new changes.

13. A computerized method for dynamically generating automation test scripts for software applications comprising multiple versions, the method comprising:

identifying a new version of a software code associated with a software application in a code repository in a software development environment;

scanning the new version of the software code;

identifying new changes to the software code based on scanning the new version of the software code;

analyzing the new changes via a Bayesian network to determine impact associated with the new changes;

determining, via the Bayesian network, a first set of new changes from the new changes that have an impact on an automation base repository associated with testing the software code;

identifying locators associated with the first set of new changes, via an Apriori algorithm;

extracting values associated with the locators;

dynamically creating a new version of a test repository corresponding to the new version in the code repository;

updating the new version of the test repository with the locators and the values of the locators;

updating the automation base repository used for generating automation test scripts associated with the software application with the new version of the test repository; and generating one or more automation test scripts for testing the new version of the software code based on the locators and the values of the locators in the base repository.

14. The computerized method according to claim 13, wherein the method further comprises:

automatically executing the one or more automation test scripts;

determining that the execution of the one or more automation test scripts is successful; and updating results associated with successful execution of the one or more automation test scripts in a test management tool.

15. The computerized method according to claim 13, wherein the method further comprises updating the automation base repository used for generating automation test scripts associated with the software application with the new version of the test repository for every release cycle associated with the software application.

16. The computerized method according to claim 13, wherein the method comprises continuously monitoring the code repository associated with the software development environment to identify creation of the new version of the software code.

17. The computerized method according to claim 16, wherein the method comprises continuously monitoring version numbers in the code repository to determine a change in a version number from a previously captured instance to identify the creation of the new version of the software code.

* * * * *